United States Patent [19]
Asano et al.

[11] Patent Number: 4,589,184
[45] Date of Patent: May 20, 1986

[54] METHOD AND APPARATUS FOR MOUNTING PARTS TO BOTH SIDES OF A MAIN BODY SUCH AS AN AUTOMOBILE BODY

[75] Inventors: Kajio Asano, Sayama; Toshihiko Sato, Kawagoe; Haruo Oda, Sakai; Yasuaki Abe, Takatsuki; Yoshitaka Watanabe, Takarazuka, all of Japan

[73] Assignee: Honda Giken Kogyo Kabushiki Kaisha, Tokyo, Japan

[21] Appl. No.: 730,340

[22] Filed: May 3, 1985

[30] Foreign Application Priority Data

Dec. 19, 1984 [JP] Japan ................................ 59-269165
Dec. 24, 1984 [JP] Japan ................................ 59-279124

[51] Int. Cl.4 .................... B23P 11/00; B23P 19/00; B23Q 15/00; B65G 43/10
[52] U.S. Cl. ................................ 29/430; 29/33 K; 29/33 P; 29/407; 29/431; 29/559; 29/712; 29/714; 29/791; 29/799; 29/824; 29/DIG. 44; 198/575; 414/225; 414/786; 901/7; 901/8
[58] Field of Search ............... 29/33 K, 33 P, 407, 29/429, 430, 431, 469, 559, 700, 703, 705, 707, 709, 711, 712, 714, 791, 799, 822, 823, 824, DIG. 44; 198/341, 572, 575; 414/222, 225, 750, 752, 786; 901/6, 7, 8, 43, 50

[56] References Cited
U.S. PATENT DOCUMENTS 3,968,559 7/1976 Karlsson .......................... 29/430
4,086,522 4/1978 Engelberger et al. ............ 29/430 X
4,411,354 10/1983 Thibault et al. .................. 29/430 X
4,553,309 11/1985 Hess et al. ....................... 29/791 X

FOREIGN PATENT DOCUMENTS 2405024 8/1975 Fed. Rep. of Germany ......... 901/7
3448 3/1977 Japan .................................... 29/430
36627 10/1978 Japan .................................... 29/824
5276 1/1979 Japan .................................... 29/824
83328 5/1982 Japan .................................... 29/823
23782 2/1984 Japan .................................... 29/700

Primary Examiner—Howard N. Goldberg
Assistant Examiner—Ronald S. Wallace
Attorney, Agent, or Firm—Barnes, Kisselle, Raisch, Choate, Whittemore & Hulbert

[57] ABSTRACT

A method of mounting parts to both sides of a main body characterized by moving a carriage at a predetermined speed along a specified path of transport with the main body placed on the carriage; moving a pair of movable tables in synchronism with the carriage in the same direction as the movement thereof, the movable tables being disposed at opposite sides of the transport path and each carrying at least one robot and an assembling device; causing the movable tables to support the main body during the synchronized movement; setting a part held by the robot in a specified position on the main body; attaching the part to the main body by the assembling device; and thereafter delivering the main body from the movable tables onto the carriage. Since the carriage is moved during the assembly of parts, this method assures the assembly line of a high-speed operation.

15 Claims, 23 Drawing Figures

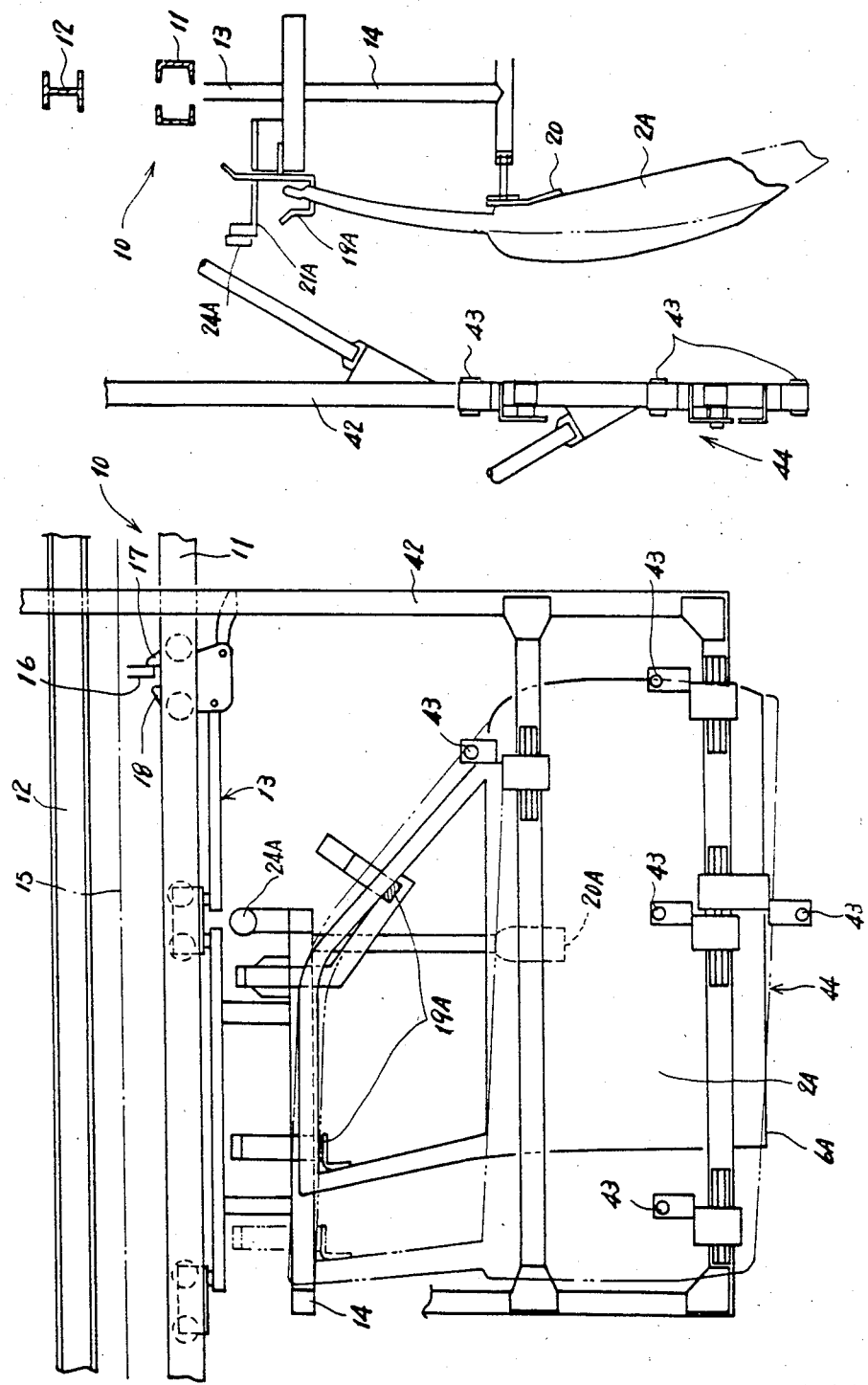

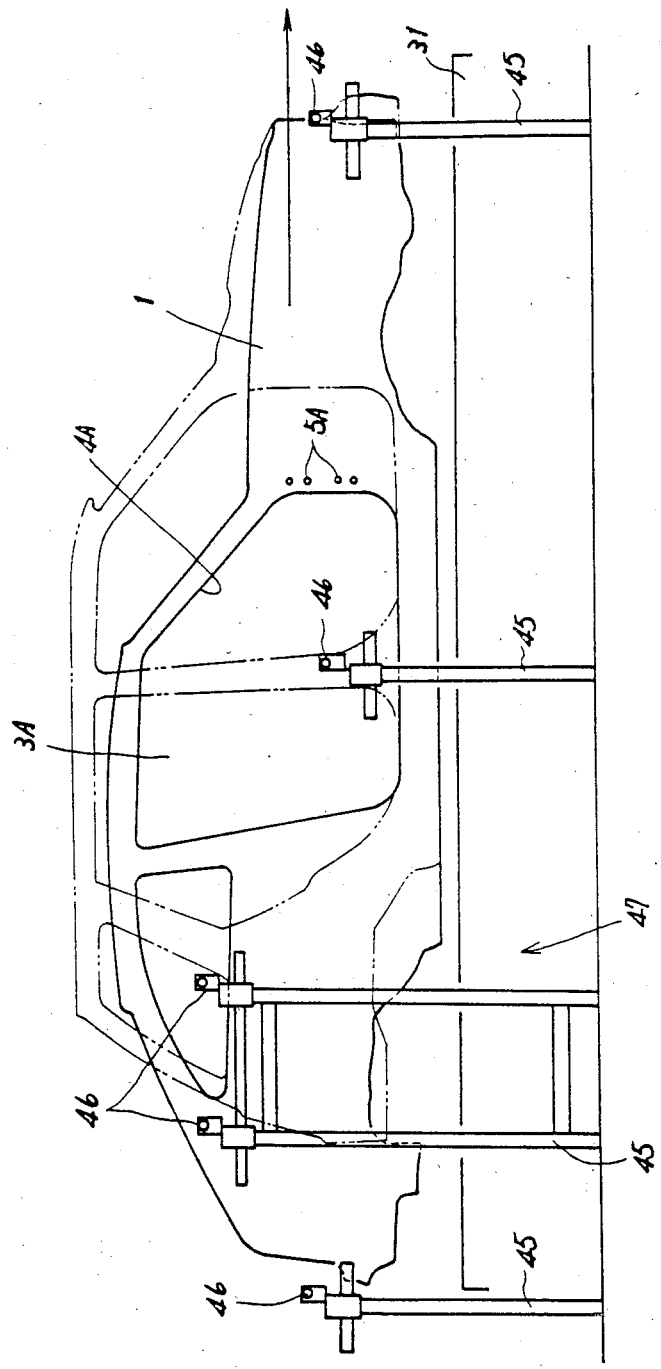

METHOD AND APPARATUS FOR MOUNTING PARTS TO BOTH SIDES OF A MAIN BODY SUCH AS AN AUTOMOBILE BODY

FIELD OF ART

The present invention relates to a method of mounting parts to both sides of a main body, for example, for use in a motor vehicle assembly line for automatically attaching doors to a motor vehicle body which is sent forward.

BACKGROUND AND SUMMARY OF THE INVENTION

Conventionally doors are mounted on the bodies of motor vehicles by causing a body transporting carriage to accurately stop at an assembly station which is provided with a door supplying device and an automatic screw tightening device, moving the door supplying device in a predeter-mined mode to set the door in the door attaching opening of the body on the carriage, and thereafter operating the screw tightening device in a predetermined mode to fasten the door to the body by bolting.

With this conventional method, however, the carriage is completely held at rest during the mounting of the door, consequently producing an adverse effect on the flow speed of the overall motor vehicle assembly line to reduce the overall operation efficiency.

To overcome the above drawback, the present invention provides a method of mounting parts to both sides of a main body characterized by moving a carriage at a predetermined speed along a specified path of transport with the main body placed on the carriage; moving a pair of movable tables in synchronism with the carriage in the same direction as the movement thereof, the movable tables being disposed at opposite sides of the path of transport and each carrying at least one robot and an assembling device; causing the movable tables to support the main body during the synchronized movement; setting a part held by the robot in a specified position on the main body; attaching the part to the main body by the assembling device; and thereafter delivering the main body from the movable tables onto the carriage.

Another object of the present invention is to provide an apparatus suitable for practicing the above method.

Another object of the invention is to supply parts to the robot at a suitable position according to the kind of the part.

Still another object of the invention is to enable the robot to receive the part reliably.

These and other objects will become apparent from the following description of embodiments of the invention with reference to the accompanying drawings.

BRIEF DESCRIPTION OF THE DRAWINGS

FIG. 4 and FIG. 5 are a side elevation and a front view, respectively, showing a door type sensor and a door supplying device;
FIG. 6 is a side elevation showing a body type sensor.

DESCRIPTION OF EMBODIMENTS

Figure 1:
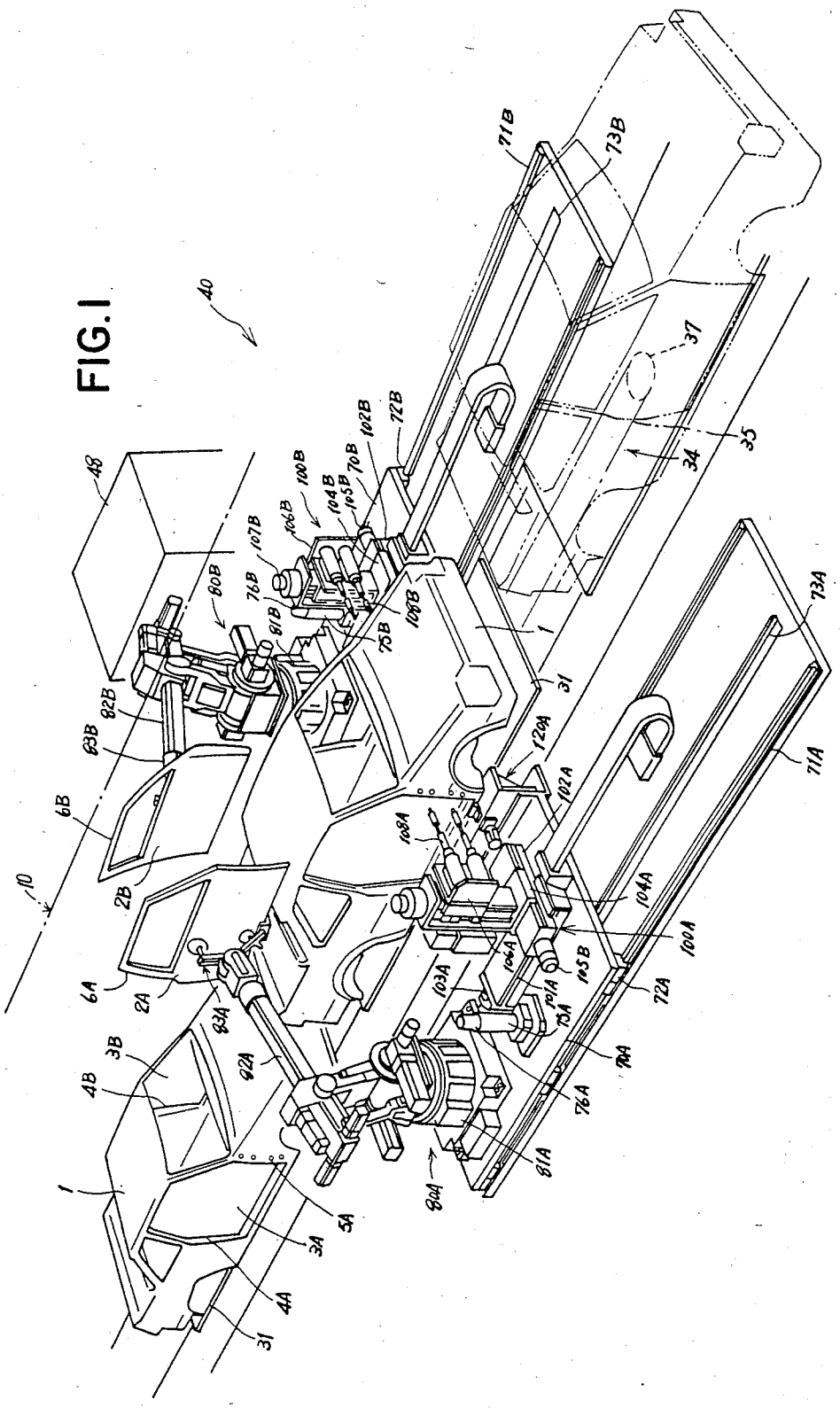
FIG. 1 is an overall perspective view showing a mounting apparatus embodying the present invention.
Figure 2:
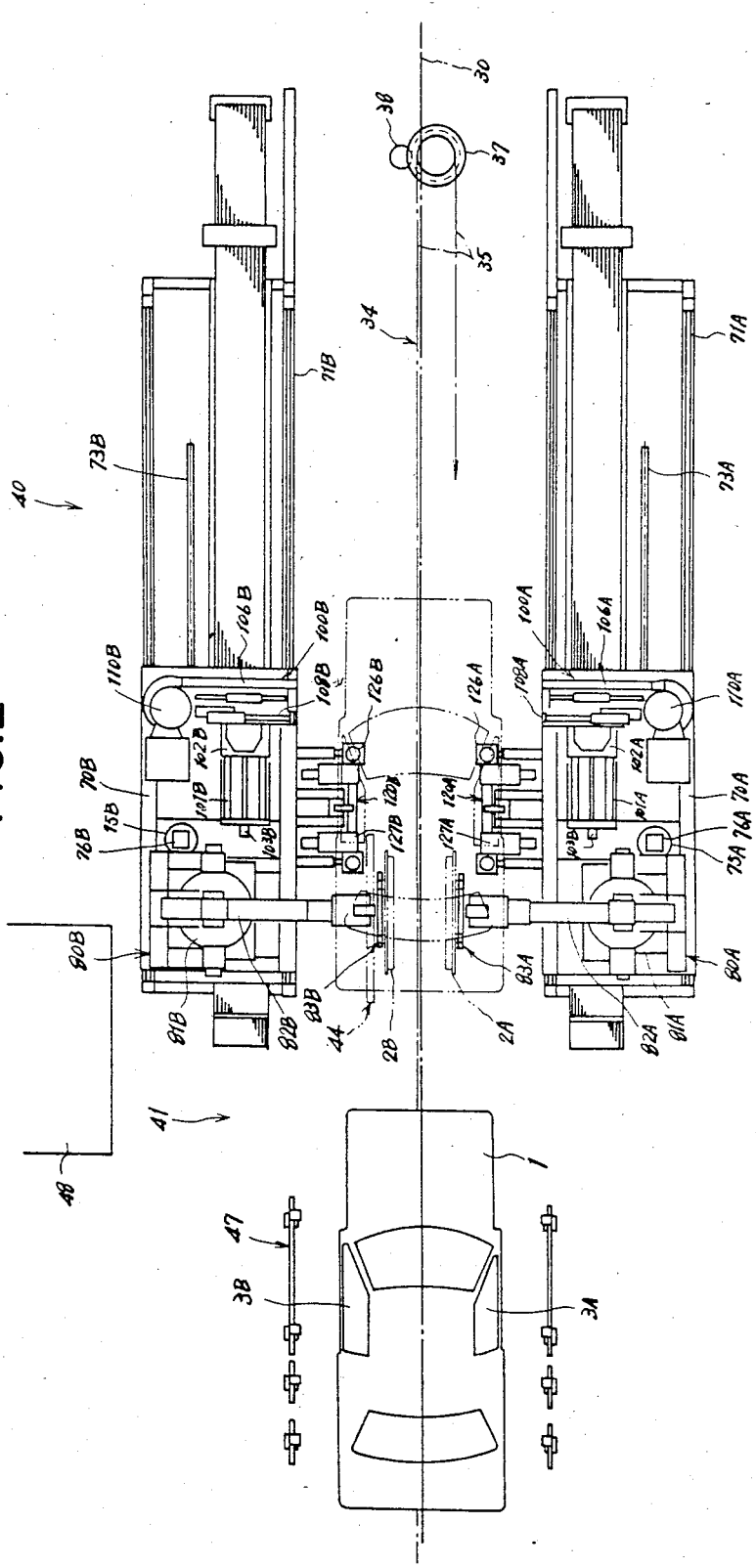
FIG. 2 is a plan view showing the apparatus.
Figure 3:
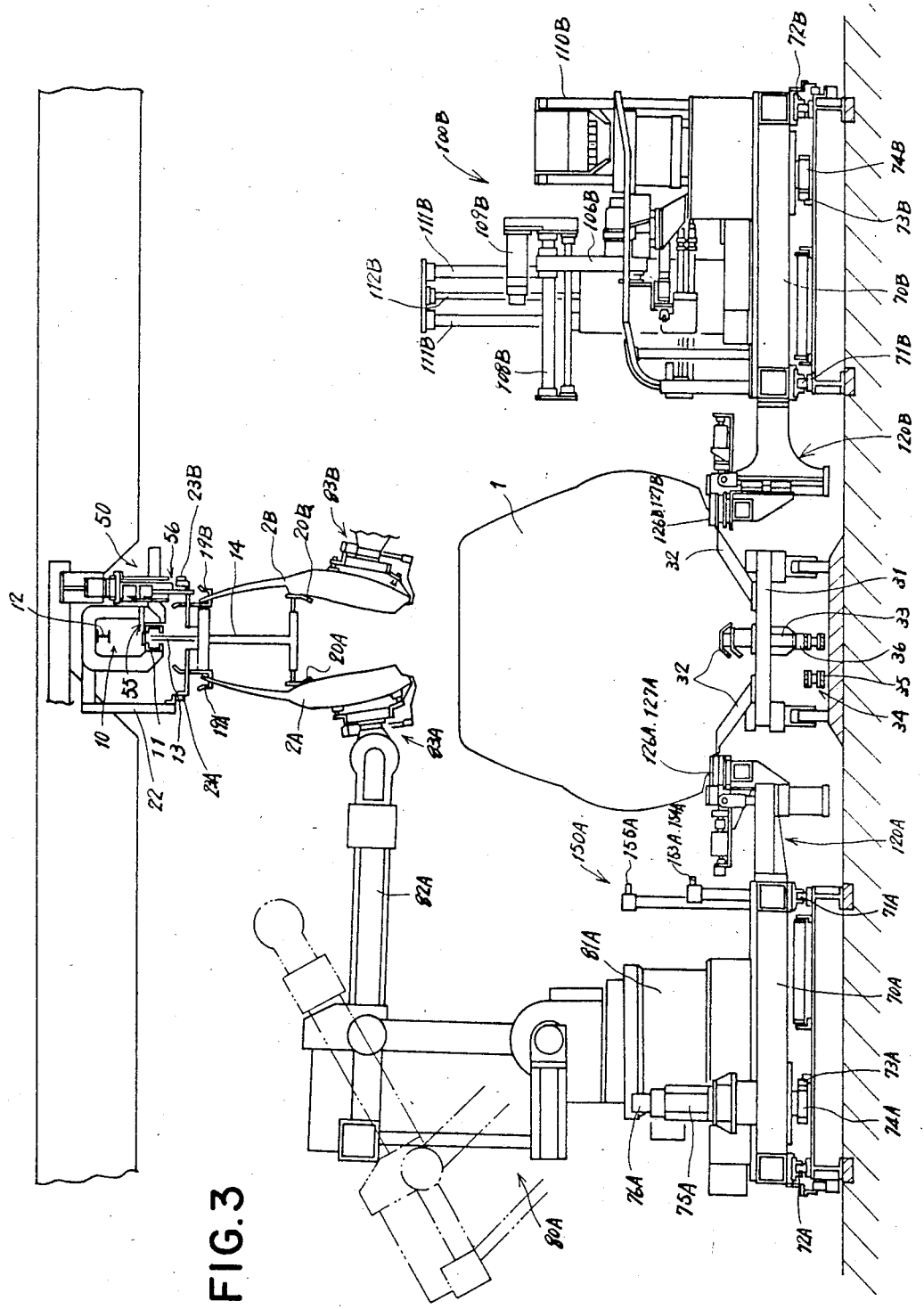
FIG. 3 is a front view showing the apparatus.

FIGS. 1 to 3 show the body 1 of a motor vehicle as an example of the main body to be worked on and doors 2A, 2B as examples of parts to be mounted to both sides of the body 1. However, the present invention is not limited to this case but can be applied to the assembly of various structures such as machine tools. The body 1 is formed at its sides with openings 3A, 3B for attaching the doors 2A, 2B. Screw holes 5A, 5B are formed in the edges 4A, 4B defining the openings close to their front portions.

FIGS. 3 to 5 and FIG. 8 show a door conveyor device 10 of the hanger type which comprises a trolley guide rail 11, a trolley drive means rail 12 provided above the rail 11 coextensive therewith, a trolley assembly 13 movable by being guided by the rail 11, a hanger 14 connected to the trolley assembly 13, and trolley drive means, such as a chain conveyor 15, guidable by the rail 12. The trolley assembly 13 is provided at its front portion with a driven dog 17 biased upward and engageable by virtue of vertical movement with a drive projection 16 projecting downward from the chain conveyor 15, and a hold dog 18 which is pivotable and opposed to the driven dog 17. (Although only one drive projection 16 is shown, the conveyor has a plurality of projections 16 as arranged longitudinally thereof at a spacing.) The hanger 14, which is adapted for holding the pair of doors 2A, 2B, has at opposite sides of its front and rear portions pairs of hooklike engaging members 19A, 19B engageable with the doors 2A, 2B and further has at opposite sides of its lower portion a pair of bearing members 20A, 20B adapted to bear against the inner surfaces of the doors 2A, 2B. The hanger 14 is further provided at an upper portion thereof with a pair of arms 21A, 21B extending sidewise. These arms 21A, 21B have at their outer ends swing preventing rollers 24A, 24B which are restrained by guide rails 23A, 23B attached to a frame 22. The conveyor device of the illustrated embodiment, which is of the hanger type, may be one adapted to carry the part as placed thereon. The drive projection 16 may be made movable vertically and engageable with the driven dog 17 which, in this case, is fixed in position.

Referring to FIGS. 1 to 3, disposed below the conveyor device 10 is a carriage 31 which is movable along a body transport path 30 parallel to the door transport path. The carriage 31 is provided thereon with support brackets 32 for supporting the body 1 for transport. The force for moving the carriage 31 is given by a floor conveyor 34 to a driven pin 33 projecting from the bottom side of the carriage 31. The floor conveyor 34 has a drive chain 35 which is provided with a plurality of projections 36 engageable with the driven pin 33. The drive chain 35 is reeved around a sprocket coupled to a servomotor 37 for driving the chain 35. A pulse generator 38 coupled to the servomotor 37 detects the speed of travel of the carriage 31, and the detected speed signal 39 is fed to a controller 48.

An assembly station 40 is provided at a specified portion of the body transport path 30. At the inlet end of the assembly station 40, there is a door type sensor 44 which comprises a multiplicity of photoelectric switches 43 attached to a holder 42 connected to the fixed frame 22 as seen in FIGS. 4 and 5. In the vicinity of the inlet end of the assembly station 40, a body type sensor 47 is disposed which comprises a multiplicity of photoelectric switches 46 attached to stands 45 on the floor (FIGS. 2 and 6). The shape and size of the body 1 and the doors 2A, 2B are different with the type of motor vehicles, and the number and locations of photoelectric switches 43, 46 which function at the same time differ from type to type. These switches 43, 46 are connected to the controller 48, which detects the type of vehicle according to the combination of such number and locations. If the body 1 and the doors 2A, 2B are for different types, the transport is discontinued with an alarm given.

Figure 7:
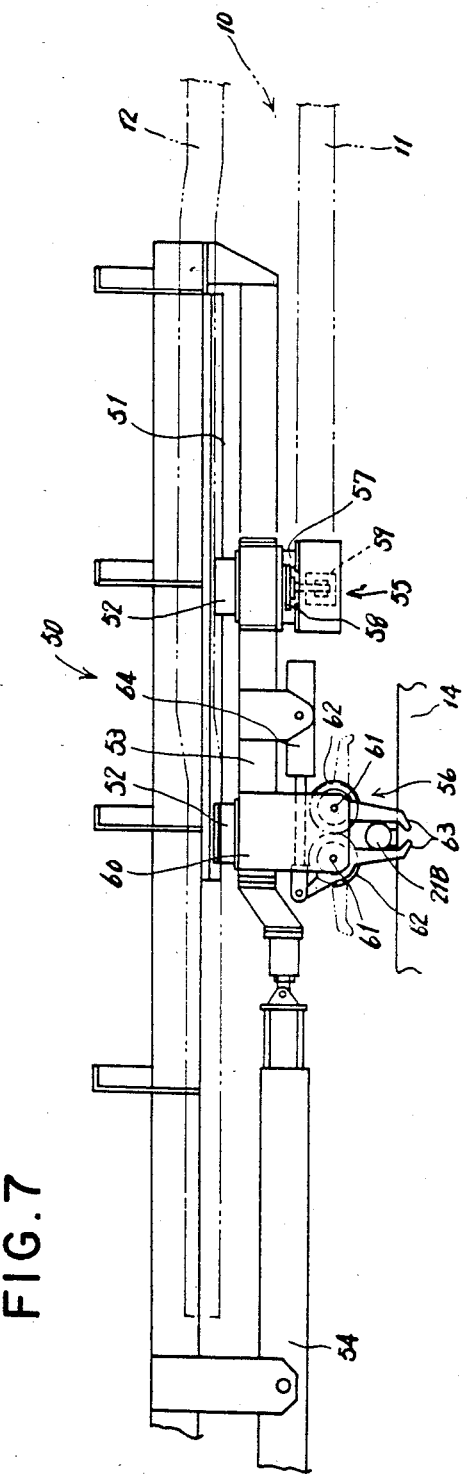
FIGS. 7 to 9 are a side elevation, front view and plan view showing a stopping-correcting device.
Figure 9:
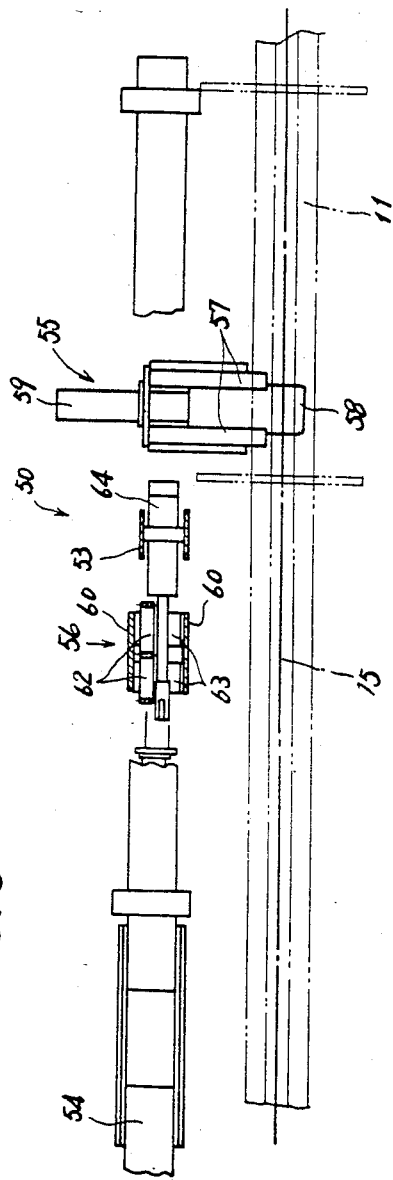
Figure 8:
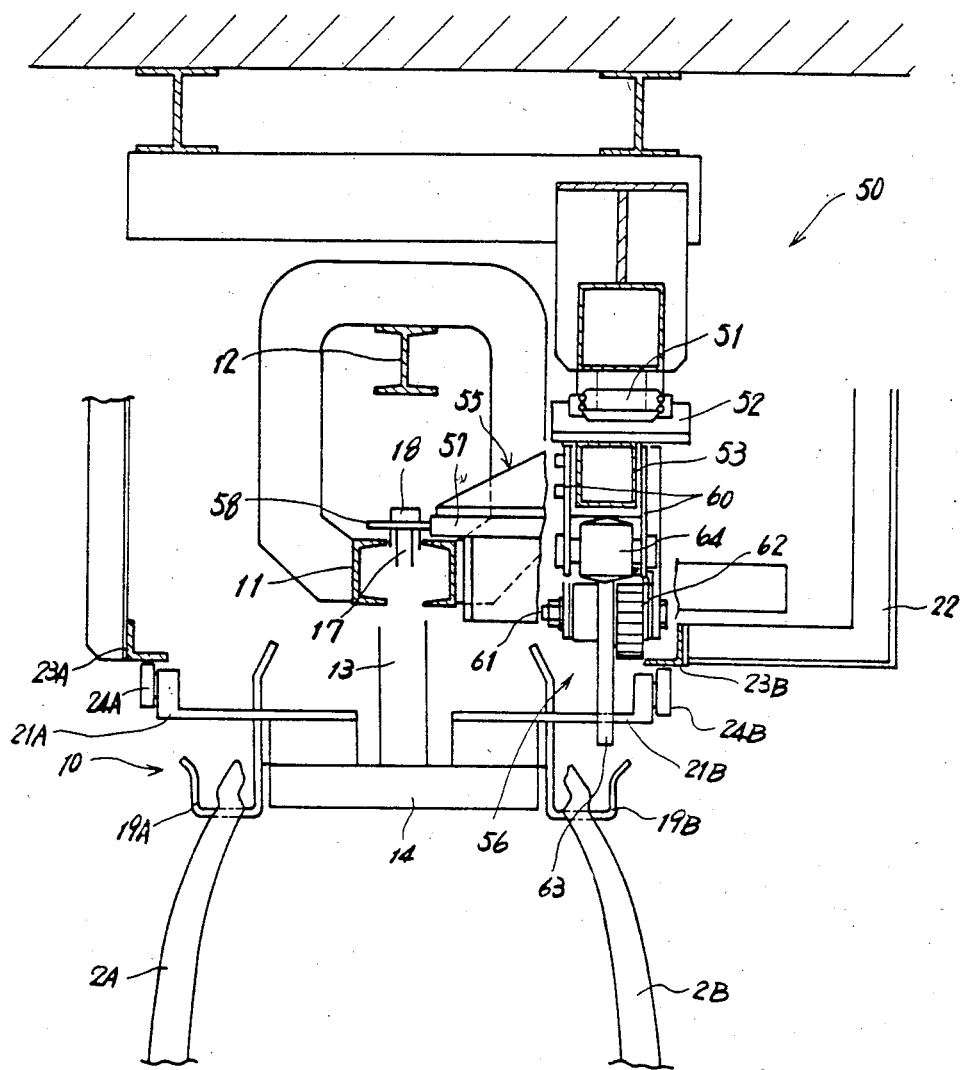

The assembly station 40 is provided at its inlet end with a stopping-correcting device 50 for stopping the trolley assembly 13 and correcting the stopped position. As shown in FIGS. 7 to 9, a guide rail 51 is fixedly provided in parallel to the rail 12. A movable beam 53 guidable along the guide rail 51 by means of a slider 52 is reciprocatingly movable by cylinder means 54. The movable beam 53 is provided with a trolley stopping assembly 55 and a clamp assembly 56 adapted to act on the arm 21B on the hanger 14. The trolley stopping assembly 55 comprises a pair of guide plates 57 attached to one end of the movable beam 53 and extending perpendicular to the body transport path 30, and a stopper plate 58 supported and guided by the guide plates 57. By the action of cylinder means 59, the stopper plate 58 is advanced to a position above the trolley guide rail 11 to retract the driven dog 17 downward out of engagement with the drive projection 16 and stop the trolley assembly 13. The clamp assembly 56, which is mounted on the other end of the movable beam 53, comprises a pair of brackets 60 extending downward from the movable beam 53, a pair of rotary shafts 61 mounted on the brackets 60 and extending perpendicular to the body transport path 30, a pair of coupling gears 62 meshing with each other and fixed to the shafts 61, a pair of clamp arms 63 attached to the rotary shafts 61, and cylinder means 64 connected between the free end of one of the clamp arms 63 and the movable beam 53.

Figure 19:
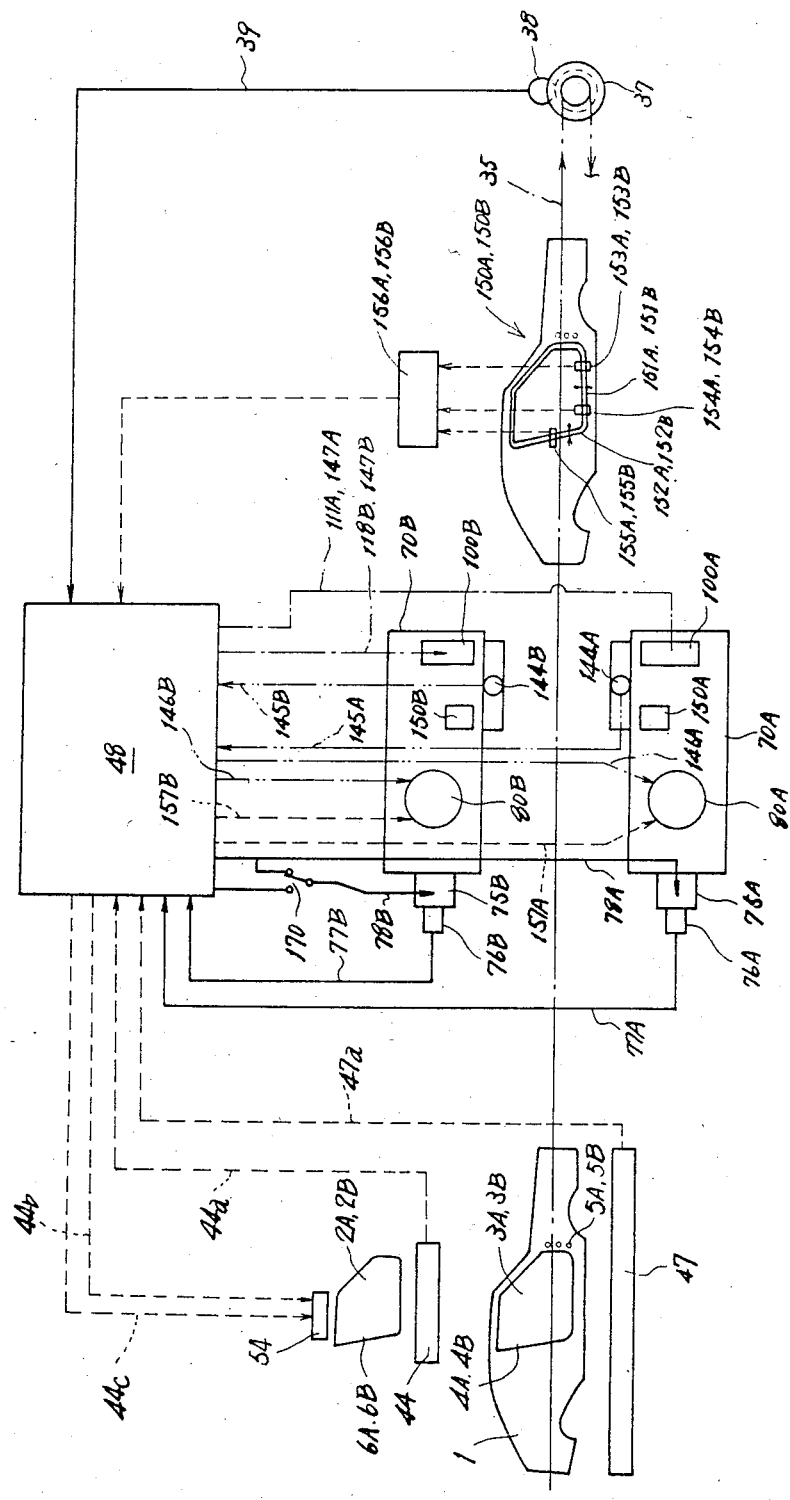
FIG. 19 is a diagram schematically showing a system for controlling the mounting apparatus.
Figure 20:
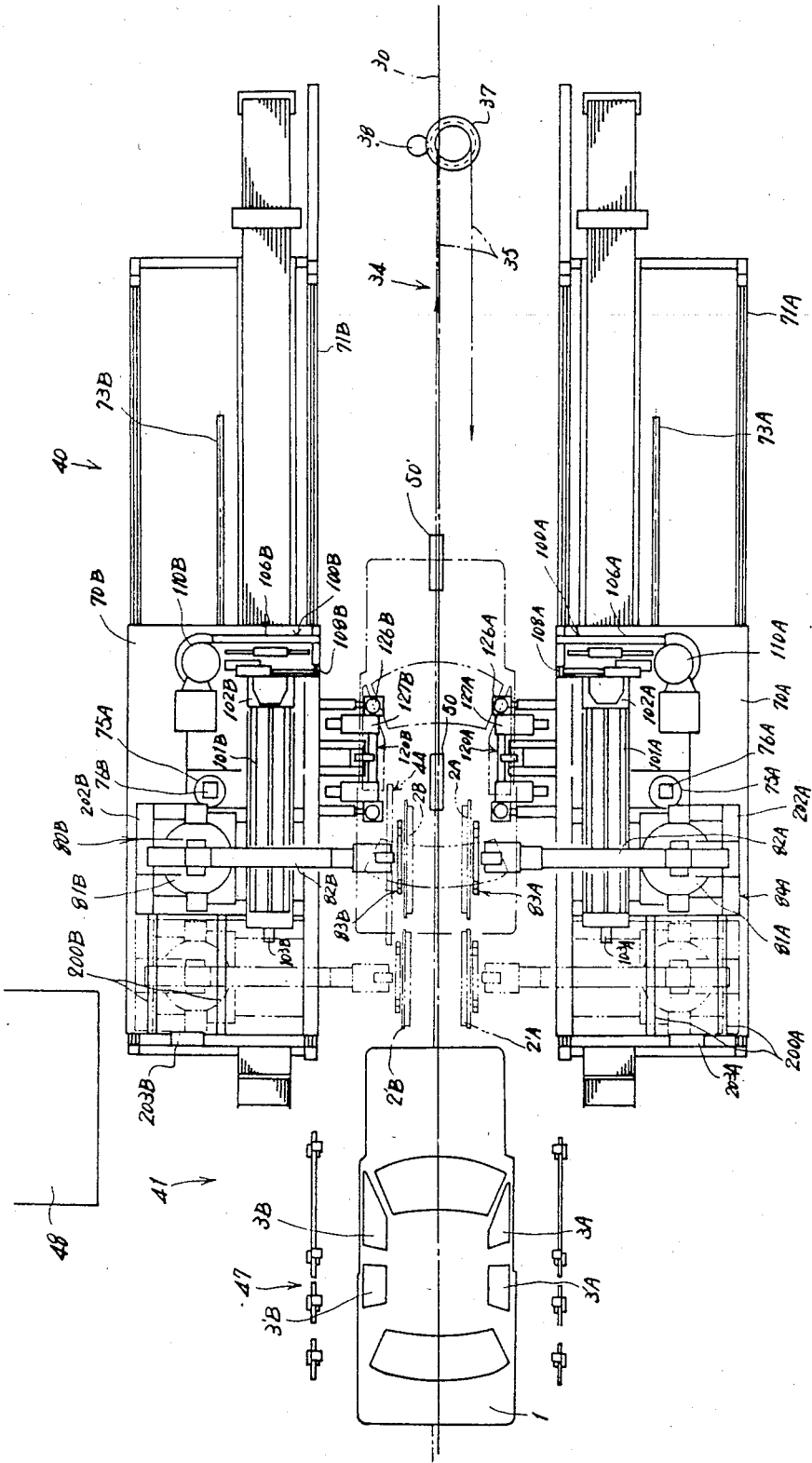
FIGS. 20 and 21 are a plan view and a front view showing another embodiment of the invention.
Figure 21:
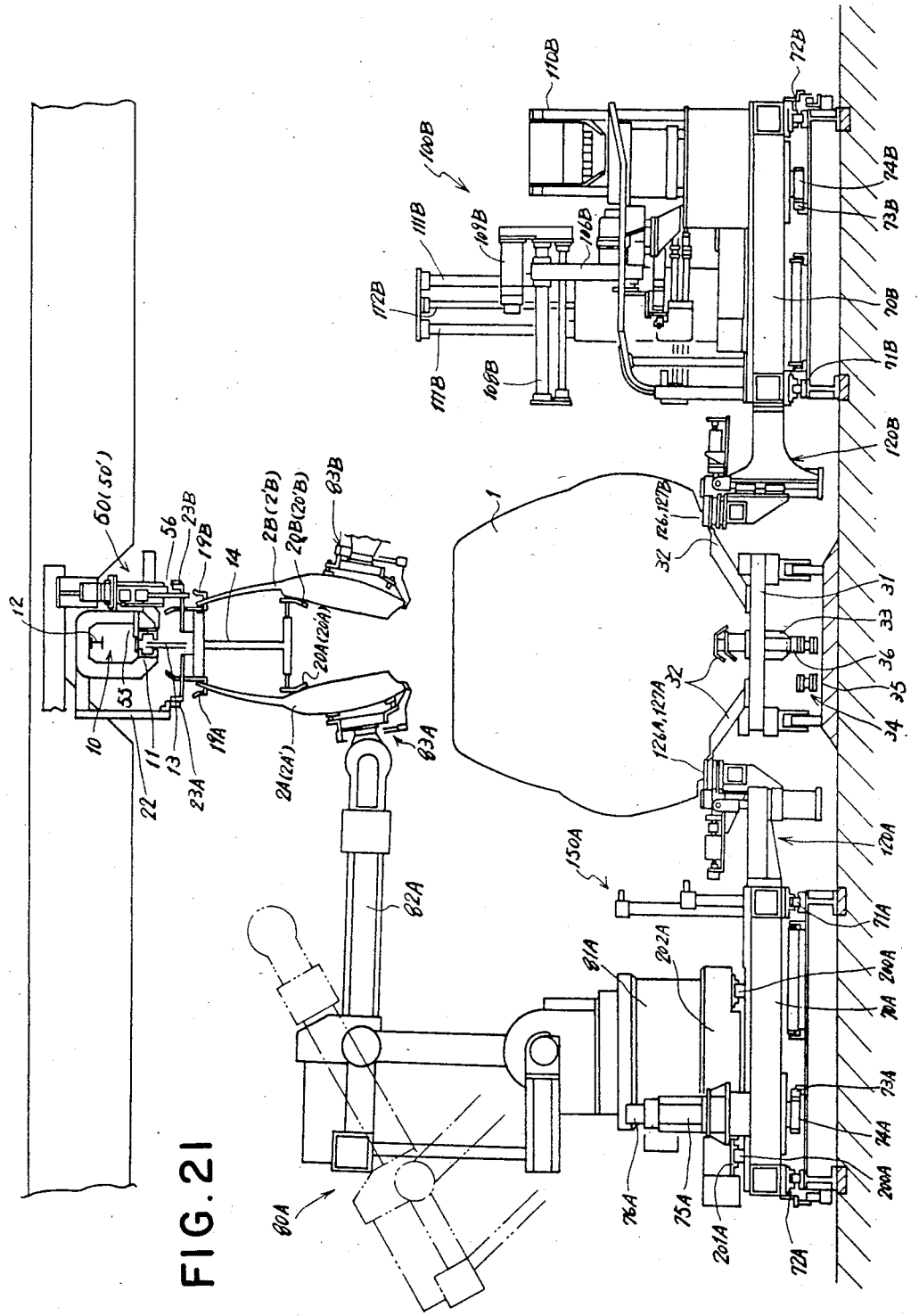
Figure 22:
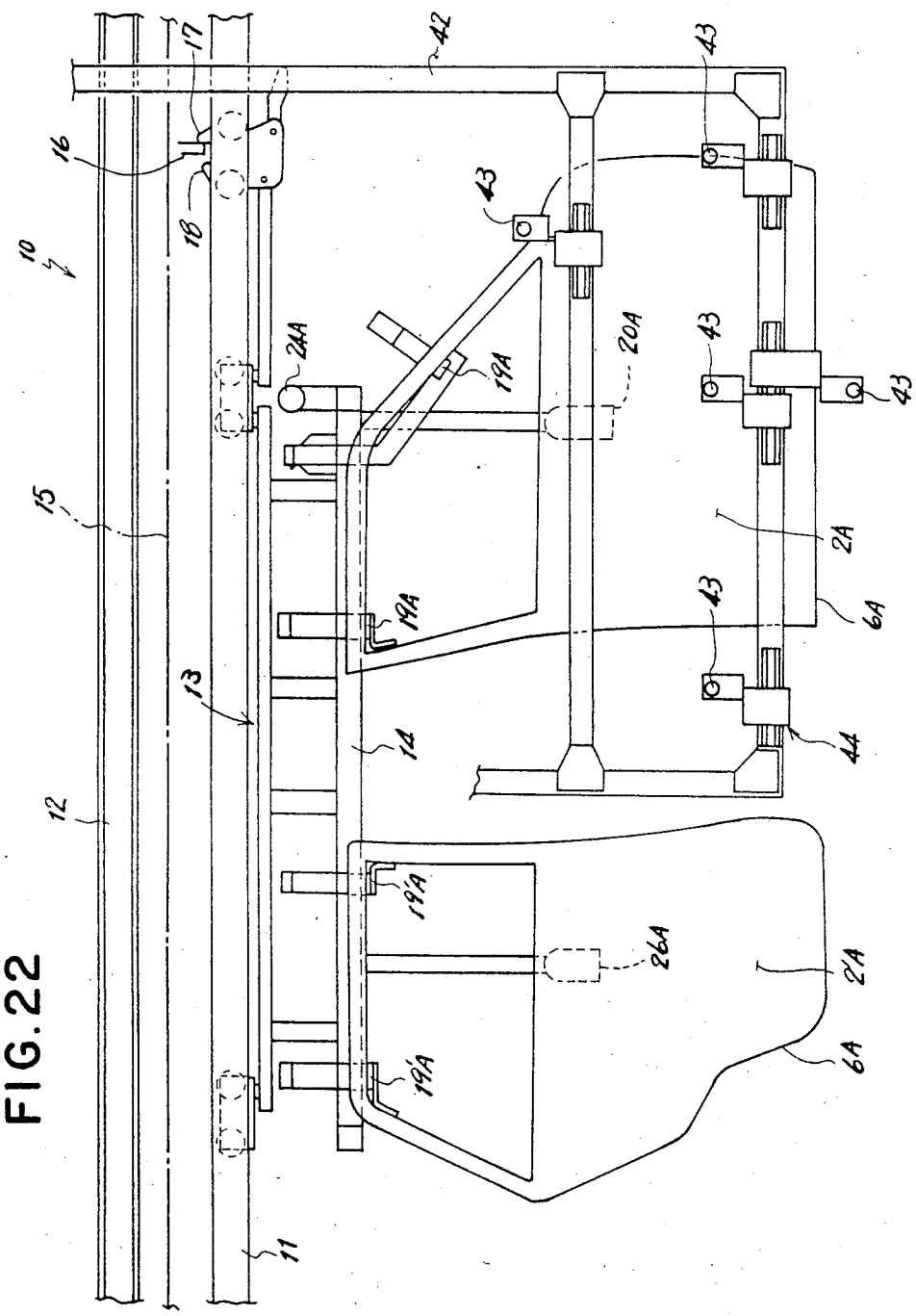
FIG. 22 is a side elevation showing a door type sensor and a door supplying device according to the second embodiment.
Figure 23:
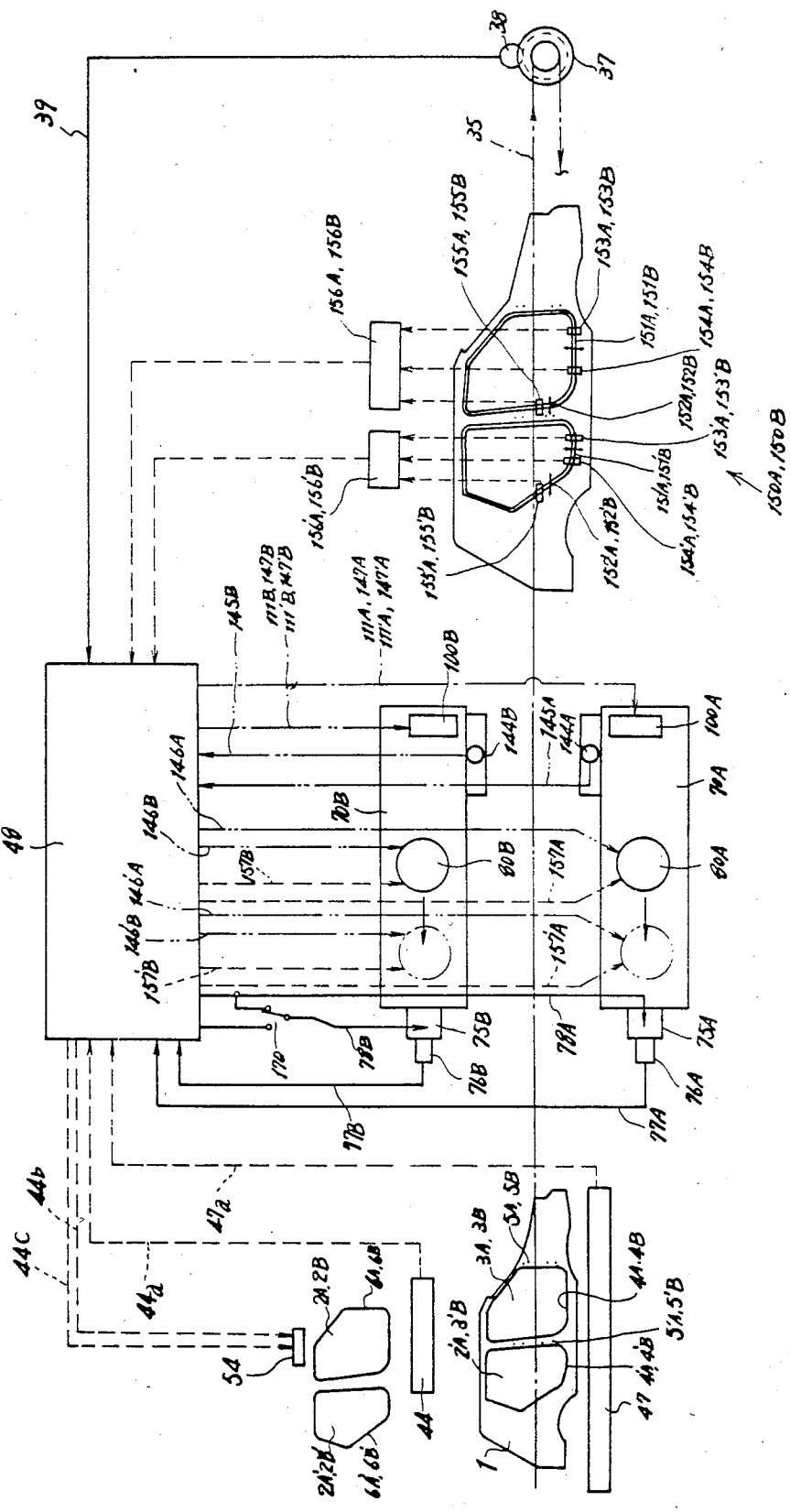
FIG. 23 is a diagram schematically showing a system for controlling the second embodiment.

As seen in FIGS. 1 to 3, movable worktables 70A, 70B are disposed on opposite sides of the assembly station 40. Each worktable 70A (70B) is supported and guided by floor rails 71A (71B) through sliders 72A (72B). A rack 73A (73B) provided along the floor rails 71A (71B) is in mesh with a pinion 74A (74B), which is driven by a servomotor 75A (75B) mounted on the worktable 70A (70B) to reciprocatingly move the worktable. In the vicinity of the servomotor 75A (75B), a pulse generator 76A (76B) is provided for detecting the speed of movement of the worktable 70A (70B). As seen in FIG. 19, the pulse generator feeds a detection signal 77A (77B) to the controller 48, which calculates the difference between the speed and the above-mentioned speed signal 39 and feeds to the servomotor 75A (75B) a control signal 78A (78B) based on the speed difference. The worktable 70A (70B) is provided thereon with a door handling robot 80A (80B) toward its one end, a screw tightening device 100 A (100B), an example of assembling device, toward the other end thereof, and a body receiving device 120A (120B) between these devices at the inner side of the worktable.

With reference to FIGS. 1 to 3, 10 and 11, the robot 80A (80B) has a drive unit 81A (81B) mounted on the worktable 70A (70B) and a three-dimensionally movable manipulating arm 82A (82B). A door holder 83A (83B), which is attached to the free end of the arm 82A (82B), comprises a generally rectangular mount frame 85A (85B) rotatably connected to the free end of the manipulating arm by a center shaft 84A (84B), hook arms 88A (88B) pivoted to a plurality of (e.g. two) lower end portions of the mount frame 85A (85B) by pins 86A (86B) and having a support face 87A (87B) engageable with the lower edge of the door 2A 92B), cylinder means 89A (89B) mounted on the mount frame 85A (85B) to act on the hook arm, and vacuum cups 90A (90B) serving as suction means and attached to the mount frame 85A (85B) close to its four corners.

As seen in FIGS. 1 to 3, 12 and 13, the screw tightening device 100A (100B) comprises a first slider 102A (102B) mounted on a guide 101A (101B) on the worktable 70A (70B) and movable in parallel to the transport path 30, a first drive unit 103A (103B) for reciprocatingly moving the first slider, a second slider 104A (104B) mounted on the first slider 102A (102B) and movable perpendicular to the transport path 30, a second drive unit 105A (105B) for reciprocatingly moving the second slider, a lift 106A (106B) mounted on the second slider 104A (104B) and vertically movable on a pair of guide rods 11A (11B), a lift drive unit 107A (107B) for vertically moving the lift by rotating a feed screw 112A (112B), a screw tightening tool 108A (108B) mounted on the lift 106A (106B) and a drive unit 109A (109B) for the tool. Indicated at 110A (110B) is a bolt feeder.

Referring to FIGS. 14 to 17, the body receiving device 120A (120B) comprises a pair of side supports 121A (121B) connected to the inner side of the worktable 70A (70B), a guide rail 122A (122B) vertically attached to the free end of each side support, a lift beam 124A (124B) supported and guided by the guide rails 122A (122B) through sliders 123A (123B), cylinder means 125A (125B) attached to a central support 160A (160B) between the side supports 121A (121B) and connected to the lift beam by a link 161A (161B), a seat assembly 126A (126B) mounted on each end of the lift beam 124A (124B), and a centering assembly 127A (127B) disposed adjacent to each seat assembly 126A (126B).

Figure 17:
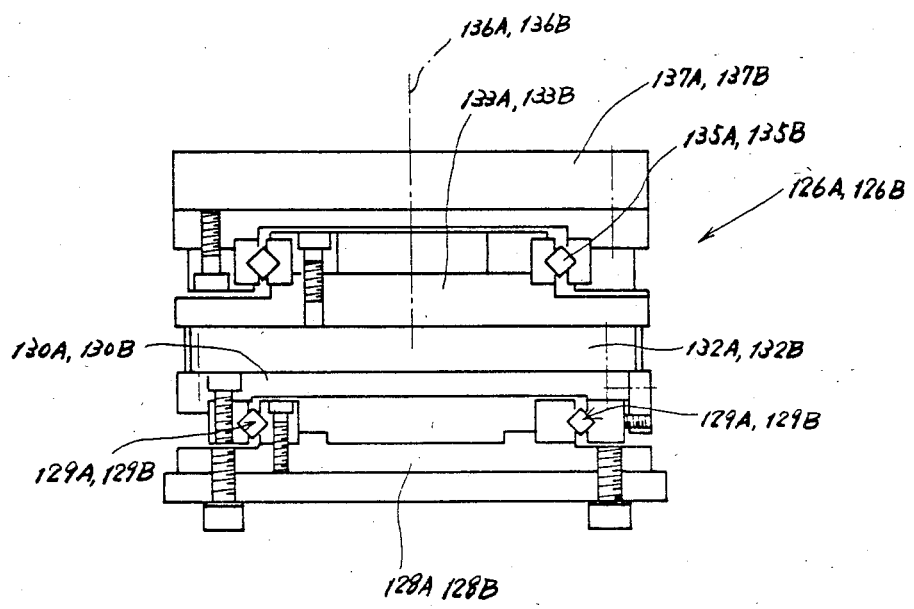
FIG. 17 is an enlarged view showing the seat assembly.

As best seen in FIG. 17, each seat assembly 126A (126B) comprises a base plate 128A (128B) mounted on the lift beam 124A (124B), a first slide plate 130A (130B)

slidably supported on the base plate 128A (128B) by a pair of roller guides 129A (129B) extending perpendicular to the transport path 30, first spring means (not shown) for biasing the first slide plate 130A (130B) toward the initial position relative to the base plate 128A (128B), a second slide plate 133A (133B) supported on the first slide plate 130A (130B) by a pair of roller guides 132A (132B) extending along the path of transport 30 so as to be slidable, second spring means (not shown) for biasing the second slide plate 133A (133B) toward the initial position relative to the first slide plate, and a receiving member 137A (137B) mounted on the second slide plate 133A (133B) by an annular roller bearing 135A (135B) and rotatable about a vertical axis 136A (136B).

Figure 14:
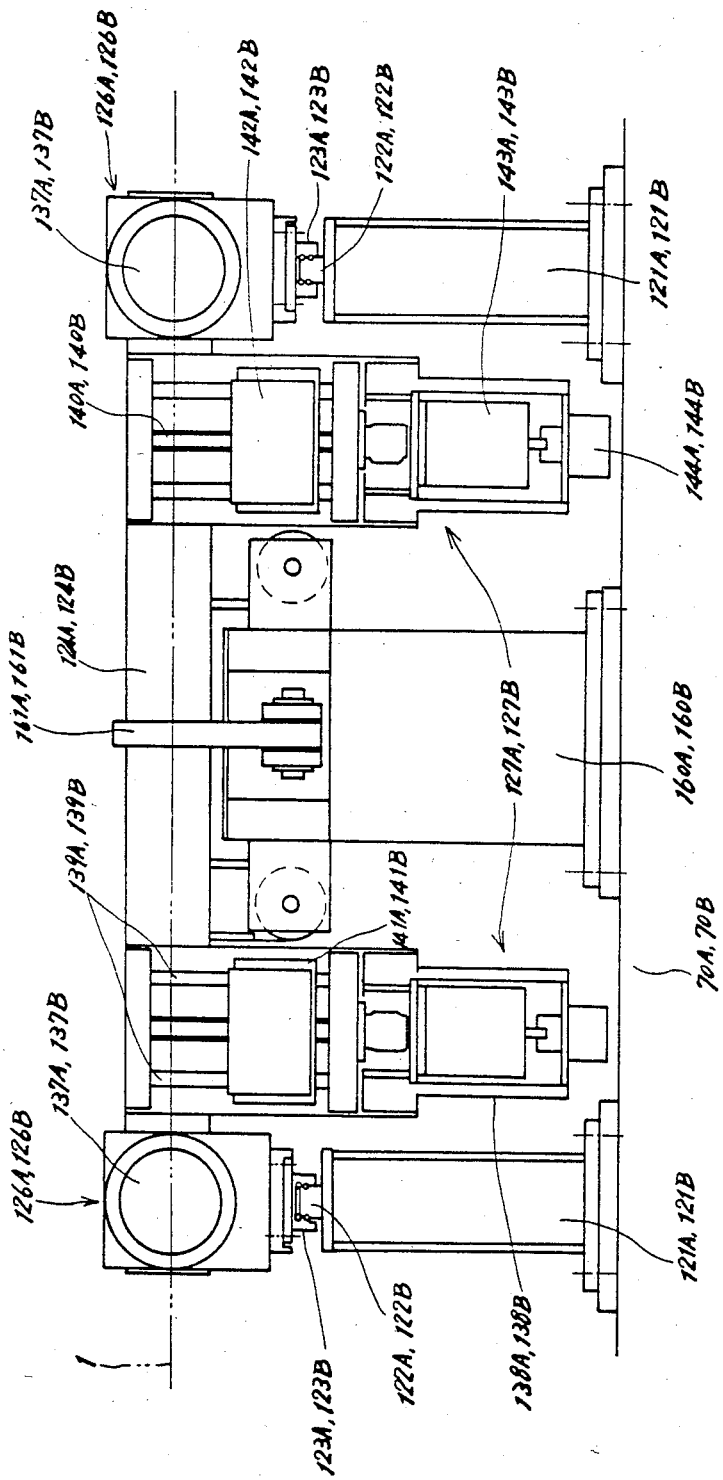
FIG. 14 is a plan view showing a body receiving device.
Figure 15:
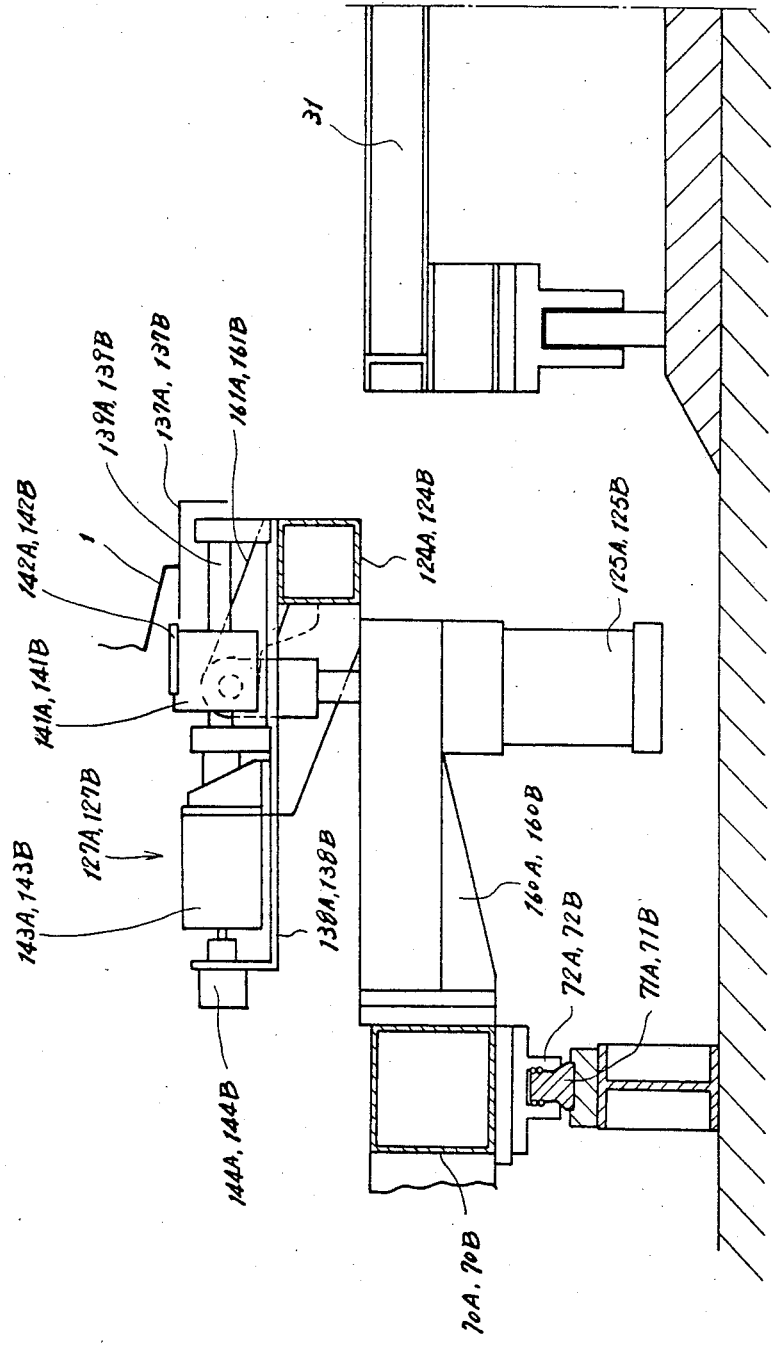
FIG. 15 is a front view partly in section and showing a centering assembly which is a component of the body receiving device.
Figure 16:
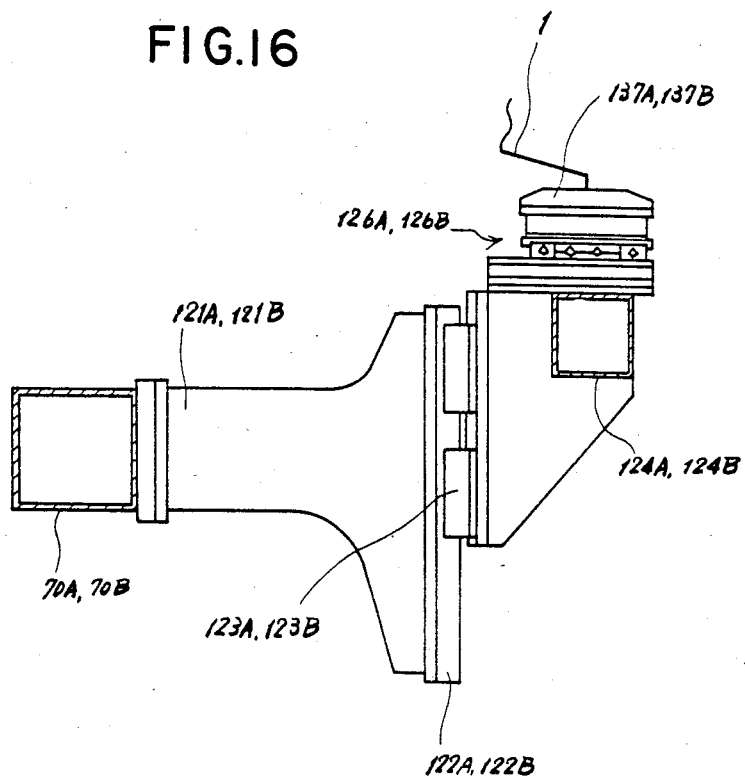
FIG. 16 is a front view partly in section and showing a seat assembly which is a component of the body receiving device.

As best seen in FIGS. 14 and 15, each centering assembly 127A (127B) comprises a pair of guide rods 139A (139B) mounted on the lift beam 124A (124B) by a frame 138A (138B) and extending perpendicular to the transport path 30, a screw rod 140A (140B) disposed in parallel to the guide rods 139A (139B), a movable member 141A (141B) screwed on the screw rod 140A (140B) and movable on the guide rods, a pusher 142A (142B) mounted on the top of the movable member, a servomotor 143A (143B) for driving the screw rod 140A (140B), and a pulse generator 144A (144B) coupled to the servomotor for detecting the amount of movement of the pusher 142A (142B). As shown in FIG. 19, the pulse generator 144A (144B) feeds a detection signal 145A (145B) to the controller 48, which gives the robot 80A (80B) an operation instruction 146A (146B) based on the amount of movement and also gives the screw tightening device 100A (100B) an operation instruction 147A (147B) based on the amount of movement.

Figure 12:
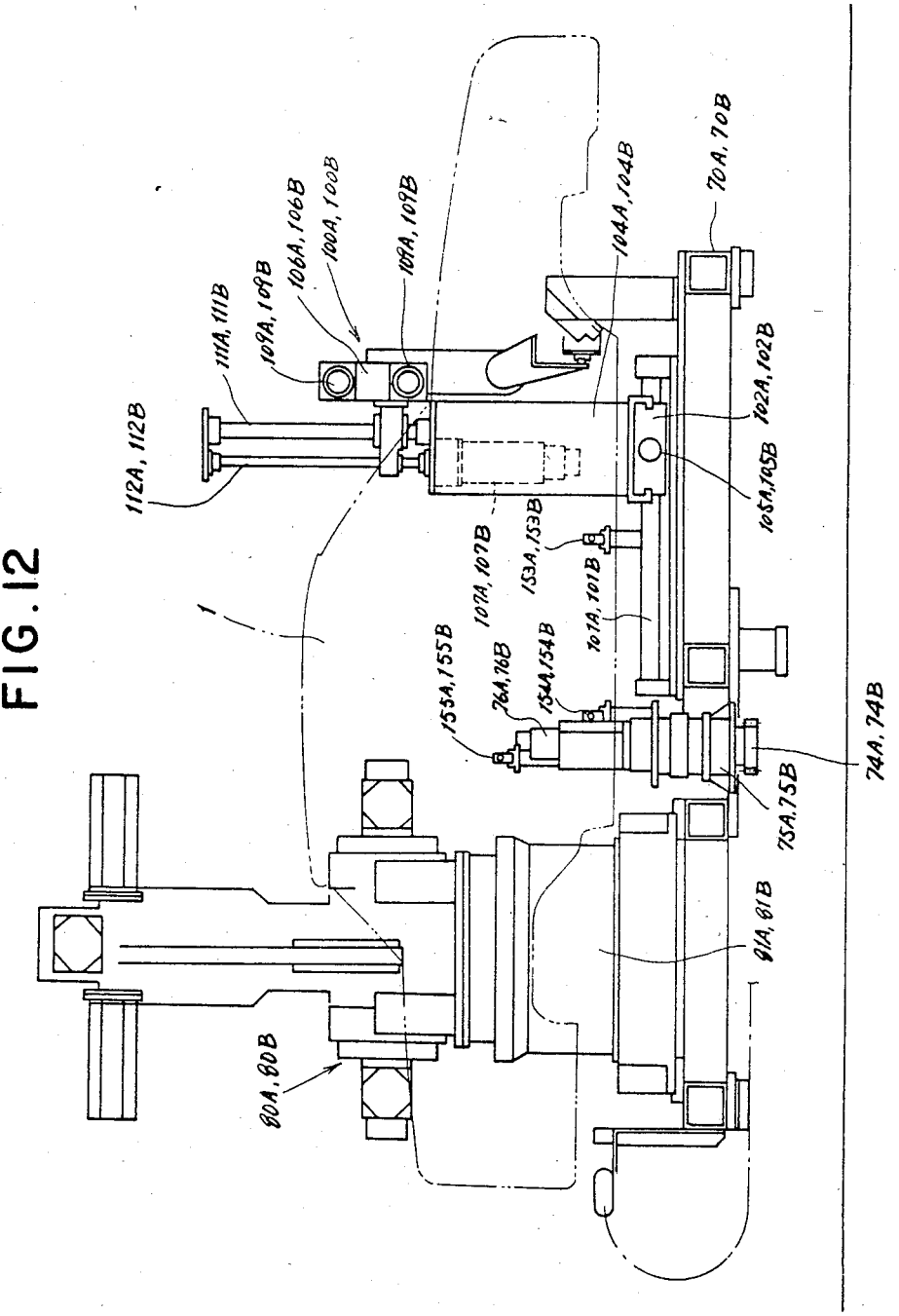
FIGS. 12 and 13 are a side elevation and a plan view showing movable tables and devices associated therewith.
Figure 13:
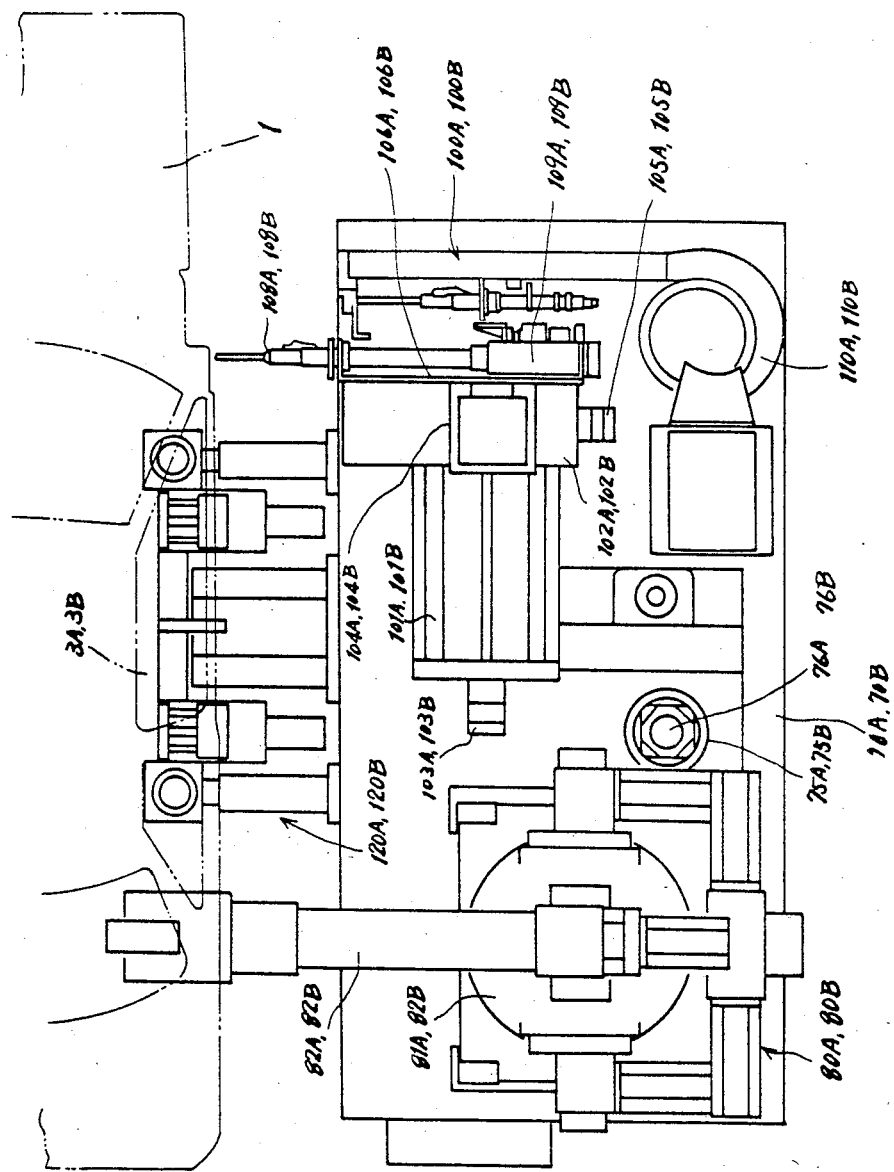
Figure 18:
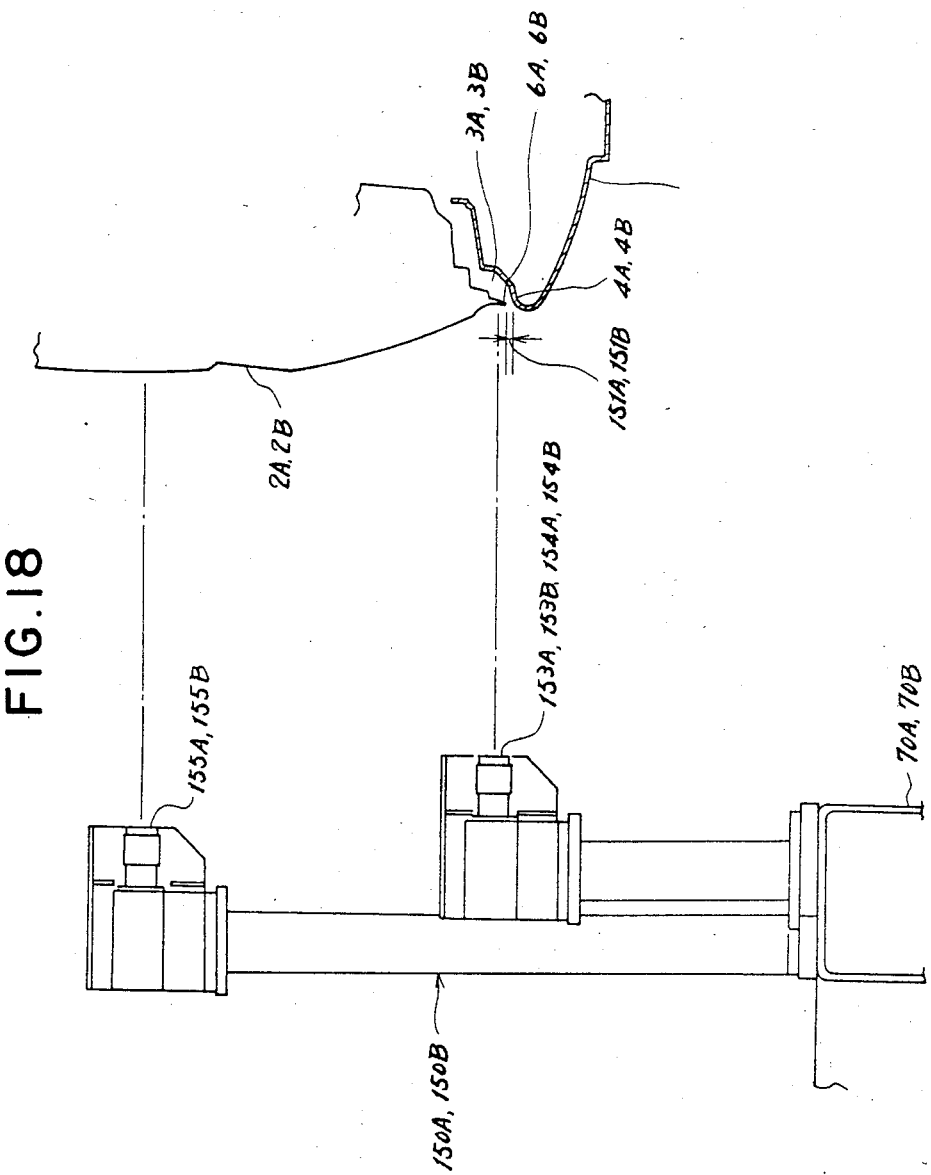
FIG. 18 is a front view showing image sensor means.

With reference to FIGS. 12, 18 and 19, each movable worktable 70A (70B) is provided with image sensor means 150A (150B) for detecting clearances 151A (151B) and 152A (152B) between the body opening edge 4A (4B) and the door edge 6A (6B). The image sensor means 150A (150B) comprises a first image sensor 153A (153B) for detecting the clearance 151A 151B) in the direction of height of the vehicle at a front portion of the door, a second image sensor 154A (154B) for detecting the clearance in the same direction at a rear portion of the door, and a third image sensor 155A (155B) for detecting the clearance 152A (152B) in the lengthwise direction of the vehicle at the rear of the door. While the third image sensor 155A (155B) serves also to detect the absolute position of the body 1, another sensor may be used specifically therefor. The values detected by the image sensors 153A (153B), 154A (154B) and 155A (155B) are fed through an amplifier 156A (156B) to the controller 48, which compares the values with reference values and gives a control signal 157A (157B) to the robots 80A (80B) based on the differences therebetween.

The operation of the apparatus will now be described. The hanger 14 holding the doors 2A, 2B with its engaging members 19A, 19B, namely the trolley assembly 13 is transported as supported by the guide rail 11, with the drive projection 16 of the chain conveyor 15 in engagement with the driven dog 17 which is spring-biased to a projected position. At the location where the door 2A (2B) is opposed to the door type sensor 44 as seen in FIGS. 4 and 5, the stopper plate 58, which is projecting laterally as shown in FIGS. 8 and 9, acts on the driven dog 17, which in turn is lowered against a spring action and brought out of engagement with the drive projection 16. Consequently, the stopper plate 58 comes into contact with the hold dog 18 to thereby stop the trolley assembly 13. The type of the door 2A (2B) thus halted is detected by the door type sensor 44, and the detection signal 44a is fed to the controller 48. Simultaneously with the stopping of the trolley assembly 13, the clamp arms 63 are pivotally moved by the cylinder means 64 from the phantom-line position to the solid-line position shown in FIG. 7 to clamp the arm 21B. Based on the detection signal 44a, the controller 48 gives a door type signal 44b to the cylinder means 54 to move the hanger 14 along with the movable beam 53. When the door 2A (2B) has reached a position specified for the type concerned, the cylinder means 54 is stopped in response to a stop signal 44c given by the controller 48.

On the other hand, the carriage 31 supporting a body 1 thereon is moved on the transport path 30 at a predetermined speed by the engagement of the driven pin 33 with a projection 36 on the drive chain 35. The body 1 has its type detected when passing by the body type sensor 47, and the detection signal 47a is fed to the controller 48, which proceeds to the next step when the two detection signals 44a and 47a are found to match. When these signals are not found to match (different types), the controller stops the carriage 31 and gives an alarm.

Figure 10:
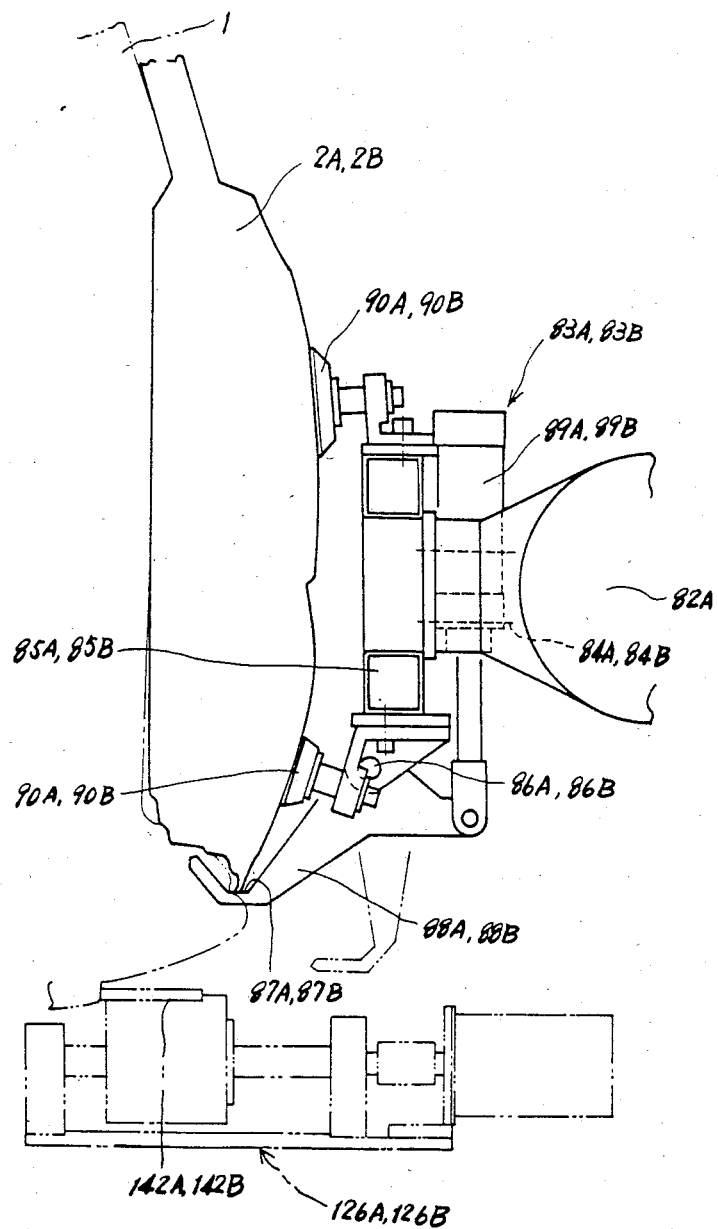
FIGS. 10 and 11 are a front view and a side elevation showing a door delivering device.
Figure 11:
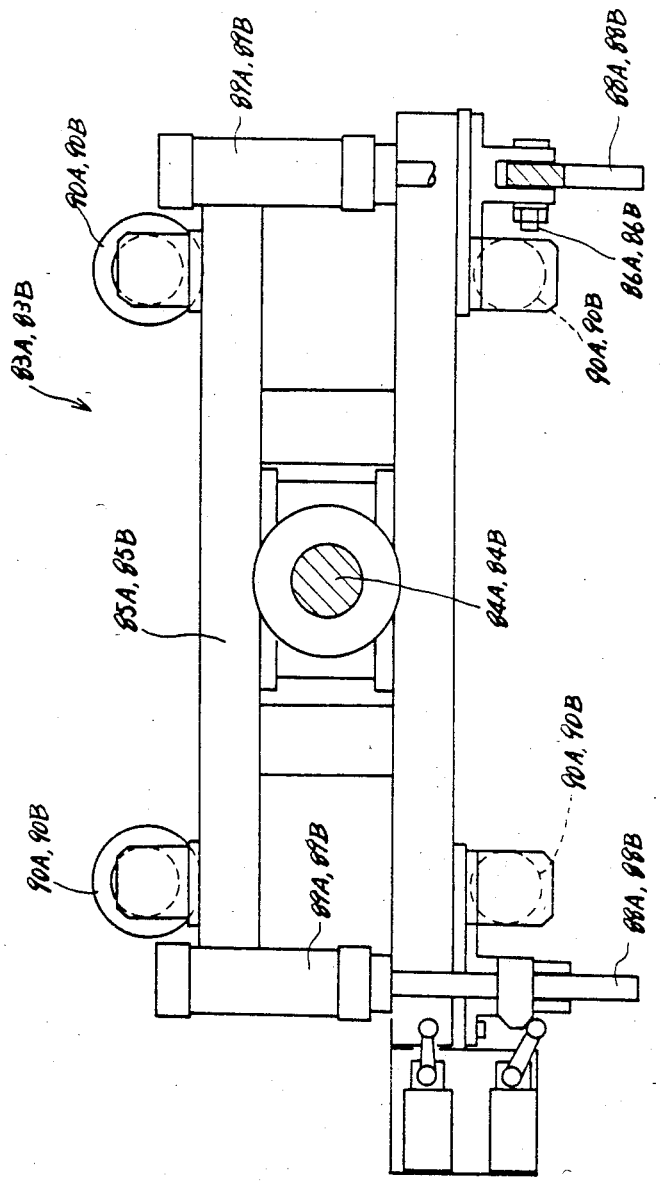

The robot 80A (80B) acts on the door 2A (2B) brought to the delivery position corrected according to the vehicle type. At this position, the robot 80A (80B) performs a basic action according to the vehicle type. The arm 88A (88B) is raised and advanced to bring the mount frame 85A (85B) close to the door 2A (2B) and, in this state, the hook arms 88A (88B) are pivotally moved to bring their support faces 87A (87B) into contact with the lower end of the door from below and raise the door, whereby the door is disengaged from the engaging members 19A (19B). Accordingly, even if the door 2A (2B) is held by the hanger 14 with its lower edge inclined, the position of the door is automatically corrected horizontally by the raising action of the hook arms 88A (88B) which are at the same level. Suction is thereafter applied to the vacuum cups 90A (90B), to which the outer surface of the door 2A (2B) is held attracted as seen in FIG. 10. By the action of the robot 80A (80B), the door is completely unloaded from the hanger 14 and carried to the body 1 as will be described below. During this procedure, the door is prevented from falling due to shake or the like by the suction of the vacuum cups 90A (90B) and the support of the door lower end by the hook arms 88A (88B).

With the door 2A (2B) received by the robot 80A (80B) and its type detected, the two movable tables 70A (70B) are moved in synchronism with the continuous travel of the carriage 31 by operating the servomotor 75A (75B). During this step, the speed value of the carriage 31 is fed to the controller 48 from the pulse generator 38 as a speed singal 39, while the speed value of the movable table 70A (70B) is fed from the pulse generator 76A (76B) to the controller 48 as a detection signal 77A (77B). The speed difference between the speed signal 39 and the detection signal 77A (77B) is calculated by the controller 48, which gives the servomotor 75A (75B) a control signal 78A (78B) based on the speed difference, whereby the movable table 70A (70B) has its speed controlled so as to move in perfect synchronism with the carriage 31. During this synchronized movement, the body 1 on the carriage 31 is raised and supported by the movable table 70A (70B). Stated more specifically, the lift beam 124A (124B) in its lowered position is raised by the cylinder means 125A (125B) to thereby raise the receiving members 137A (137B) into contact with the lower end of the body 1 and raise the body 1 to the state shown in FIG. 15. Subsequently, the centering assembly 127A (127B) having its pusher 142A (142B) opposed to the lower edge of the body 1 from outside is operated according to the vehicle type signal 47a obtained from the body type sensor 47. Thus, the servomotor 143A (143B) is driven to cause the movable member 141A (141B) to move the pusher 142A (142B) toward the other pusher 142B (142A). The two pushers 142A, 142B therefore hold the lower edges of the body 1 from opposite sides to center the body 1. At this time, the body lower end acts to slide relative to the receiving members 137A (137B) depending on the initial rested position of the body 1 relative to the receiving members 137A (137B), but this is absorbed by the movement of the first slide plate 130A (130B), against the first spring means, in the direction of width of the vehicle, by the movement of the second slide plate 133A (133B), against the second spring, in the lengthwise direction of the vehicle, and by the rotation of the receiving member 137A (137B) about the vertical axis (136A (136B) with respect to the circumferential direction. Consequently, no sliding movement of the body occurs. The width of the body 1 is not definite but varies randomly from body to body within the range of several millimeters. Accordingly the amount of movement of the pusher 142A (142B) for centering is indefinite even for vehicles of the same type. The actual amount of movement of the pusher 142A (142B) is detected by the pulse generator 144A (144B), and the detection signal 145A (145B) is given to the controller 48. Based on the signal, the controller 48 gives the robot 80A (80B) and the screw tightening device 100A (100B) operation instructions (chiefly amounts of advance) 146A (146B) and 147A (147B) in accordance with the width of the body 1.

The door 2A (2B) is supplied to the centered body 1. First, by the basic action of the robot 80A (80B) according to the vehicle type concerned, the door 2A (2B) is positioned close to and as opposed to the body opening 3A (3B) outside thereof. Next, the clearance 151A (151B) in the direction of height is detected by the first image sensor 153A (153B) and the second image sensor 154A (154B), and the lengthwise clearance 152A (152B) and the absolute position of the body 1 are detected by the third image sensor 155A (155B). The detection signals are fed to the controller 48, which in turn feeds a control signal 157A (157B) to the robot 80A (80B). In response to the control signal 157A (157B) indicating the direction of movement, the robot moves the door 2A (2B) so that the clearances 151A (151B) and 152A (152B) will become reference values. At this time, the posture of the door 2A (2B) is adjusted also by the presence of the first image sensor 153A (153B) and the second image sensor 154A (154B). Further according to the positions of the clearances 151A (151B) and 152A (152B), the controller 48 gives the screw tightening device 100A (100B) an instruction signal 111A (111B) for movement. When the amounts of clearances 151A (151B) and 152A (152B) have reached the reference values as mentioned above, the control signal 157A (157B) is discontinued. Further before or after this, the hook arms 88A (88B) are lowered as indicated in a phantom line in FIG. 10. An instruction is given to the robot to push the door 2A (2B) in. The amount of pushing is based on the operation instruction 146A (146B) mentioned. After the door has been pushed in place, the screw tightening device 100A (100B) operates under the control of the controller 48 to attach the door to the body 1 by screwing bolts as specified. The device 100A (100B) is then brought to its standby position, the vacuum cups 90A (90B) are freed from suction and the robot 80A (80B) is brought to its standby position.

The body 1 completely assembled is returned onto the carriage 31 again which is positioned immediately below the body 1 by virue of the synchronized movement of the movable table 70A (70B) and the carriage 31. Accordingly the body 1 can be delivered onto the support brackets 32 on the carriage 31 by lowering the lift beam 124A (124B).

The carriage 31 with the body 1 placed thereon is moved to the next process. On completion of unloading by the robot, the clamp arms 63 and stopper plate 58 are freed from engagement in response to a signal from the controller, so that the unloaded hanger 14 has already been transferred to the location of next process. Immediately after the transfer, the stopping-correcting device 50 is returned to its standby position. After the delivery of the body 1, the unloaded movable table 70A (70B) is returned at a high speed for receiving the next door 2A (2B).

While the controller 48 gives the control signals 78A and 78B to the servomotors 75A and 75B, only one of these control signal can be given via a coupled movement-single movement switch 170 to operate the two movable tables 70A, 70B in synchronism as seen in FIG. 19. However, switch 170 is not an essential component.

Another embodiment of the invention will be described next with reference to FIGS. 20 to 23.

The embodiment shown in FIGS. 20 to 23 are adapted to assemble four-door vehicles and have the same construction as the embodiment of FIGS. 1 to 19 except the following features.

(1) The motor vehicle body 1 shown of course has two pairs of openings 3A, 3B and 3'A, 3'B. Indicated at 4A, 4B and 4'A, 4'B are opening edges.

(2) A hanger 14 is provided at its front and rear portions with four pairs of hooklike engaging members 19A, 19B and 19'A, 19'B for holding two pairs of doors 2A, 2B and 2 ∝ A, 2'B in suspension. Indicated at 6A, 6B and 6'A, 6'B are door edges.

(3) At two locations above the path 30 of transport of the body 1, stopping-correcting devices 50, 50' having exactly the same construction as the foregoing one are disposed.

(4) Because screws are tightened up on the body 1 at two locations which are apart longitudinally of the body 1, screw tightening device 100A (100B) includes a guide 101A (101B) which is longer than the one in the foregoing embodiment and a first slider 102A (102B) which is movable over an increased range.

(5) Image sensor means 150A, 150B comprise image sensors 153A, 153B; 154A, 154B; 155A, 155B; 153'A, 153'B; 154'A, 154'B and 155'A, 155'B, i.e. twelve sensors in total.

(6) A robot 80A (80B) is movable on the movable table 70A (70B). For this purpose, a pair of guide rails 200A (200B) are provided on the movable table 70A (70B) in parallel with the body transport path 30. The robot has a base 202A (202B) slidably mounted on the guide rails 200A (200B) by sliders 201A (201B). The robot can be reciprocated by drive means 203A (203B).

The apparatus of the above construction operates in the following manner.

First, the trolley assembly 13, i.e. the hanger 14 is stopped by the upstream stopping-correcting device 50, with the front door 2A (2B) opposed to the door type sensor. Consequently, the position of the front door 2A (2B) is corrected in accordance with a detection signal 44a from the door type sensor 44. The robot 80A (80B) and the screw tightening device 100A (100B) in the initial position indicated in solid lines in FIG. 20 thereafter operate to completely mount the front door 2A (2B) in the body front opening 3A (3B) in exactly the same manner as in the foregoing embodiment.

After the front door 2A (2B) has been completely attached, the carriage 31 and the movable table 70A (70B) are halted at the same time. By this time, the hanger 14 is already brought to a downstream position as halted by the downstream stopping-correcting device 50' and has its position corrected according to a detection signal obtained when the rear door 2'A (2'B) passed by the door type sensor 44. The robot 80A (80B) is moved upstream on the movable table 70A (70B) and brought to the phantom-line position in FIG. 20. (However, the movable table is moved forward.) The rear door 2'A (2'W'B) is thereafter held by the robot 80A (80B) in the same manner as above, and the carriage 31 and the movable table 70A (70B) are then caused to run in synchronism again. The robot 80A (80B) supplies the rear door 2'A (2'B) to the body 1. More specifically, the rear door 2'A (2'B) is positioned close to the body opening 3'A 3'B) as opposed thereto from outside by a basic action according to the vehicle type concerned. The rear door clearance 151'A (151'B) in the direction of height of the vehicle is detected by the fourth image sensor 153'A (153'B) and the fifth image sensor 154'A (154'B). The rear door clearance 152'A (152'B) in the lengthwise direction is further detected by the sixth image sensor 155'A (155'B). The detection signals are fed through the amplifier 156'A (156'B) to the controller 48, which feeds a control signal 157'A (157'B) to the robot 80A (80B). In response to the control signal 157'A (157'B) which indicates the direction of movement, the robot 80A (80B) moves the rear door 2'A (2'B) so that the clearances 151'A (151'B) and 152'A (152'B) become reference values. At this time, the posture of the rear door 2'A (2'B) is adjusted also by the presence of the fourth and fifth image sensors 153'A (153'B), 154'A (154'B). Further according to the position of the clearances 151'A (151'B), 152'A (152'B), the controller 48 gives a movement instruction signal 111'A (111'B) to the screw tightening device 100A (100B). As in the case of the foregoing embodiment, when the amounts of clearances 151'A (151'B), 152'A (152'B) have reached the reference values, the control signal 157'A (157'B) to the robot 80A (80B) is discontinued. Before or after this, the hook arms 88A (88B) are pivotally moved downward (see FIG. 10). The robot is given an instruction to push in the rear door 2'A (2'B), the amount of pushing being based on the operation instruction 147'A (147'B) as in the foregoing embodiment. After the door has been pushed in place, the screw tightening device 100A (100B) operates under the control of the controller 48 to attach the rear door 2'A (2'B) to the body by screwing as contemplated. The device 100A (100B) is thereafter brought to its standby position, the door is released from the suction of the vacuum cups 90A (90B), and the robot 80A (80B) is set in its standby position. The same operation as in the foregoing embodiment thereafter follows.

According to the embodiment of FIGS. 20 to 23, the pair of robots 80A (80B) mounted on the two movable tables 70A (70B) are made movable on the tables along the body transport path 30. However, when two pairs of robots are mounted on the movable tables, four doors can be attached to a motor vehicle body at the same time automatically without shifting these robots.

What is claimed is:

1. A method of mounting parts to both sides of a main body characterized by moving a carriage at a predetermined speed along a specified path of transport with the main body placed on the carriage; moving a pair of movable tables in synchronism with the carriage in the same direction as the movement thereof, the movable tables being disposed at opposite sides of the transport path and each carrying at least one robot and an assembling device; causing the movable tables to support the main body during the synchronized movement; setting a part held by the robot in a specified position on the main body; attaching the part to the main body by the assembling device; and thereafter delivering the main body from the movable tables onto the carriage.

2. A method as defined in claim 1 wherein the speed of movement of the carriage and the speed of movement of each movable table are individually detected and fed to a controller, and the controller individually controls servomotors as drive means for the movable tables based on the difference between the speed of movement of the carriage and the speed of movement of each movable table to move the movable tables in synchronism with the carriage.

3. A method as defined in claim 2 wherein the speed of movement of the carriage is detected by a pulse generator coupled to drive means for the carriage, and the speed of movement of each movable table is detected by a pulse generator coupled to the servomotor for the table.

4. A method as defined in claim 1 wherein the main body has at least one opening at each side thereof, and the clearance between the opening defining inner edge and the outer edge of the part is detected by a sensor when the part held by the robot is positioned close to the opening, the detected value being fed to a controller for the controller to compare the detected value with a predetermined reference value, to correct the position of the part relative to the opening by controlling the robot in accordance with the difference and to thereafter set the part in the opening.

5. A method as defined in claim 1 wherein the movable tables are provided with a pair of centering devices each having an element engageable with a side portion of the main body by projecting toward the transport path, and the amount the element moves before the main body is completely centered is given to a controller for the controller to give the robot and the assembling device an operation instruction based on the amount of movement.

6. A method of mounting parts to both sides of a main body characterized by moving a carriage at a predetermined speed along a specified path of transport with the main body placed on the carriage; moving a pair of movable tables in synchronism with the carriage in the same direction as the movement thereof, the movable tables being disposed at opposite sides of the transport path and each carrying at least one robot and an assembling device; causing the movable table to support the main body during synchronized movement; setting a first part held by the robot in a first specified position on the main body during the synchronized movement; attaching the first part to the main body by the assembling device; thereafter stopping the two movable tables and the carriage at the same time; causing the robot to hold a second part during the stopping; causing the two movable tables and the carriage to run again in synchronism, thereafter causing the robot to set the second part in a second specified position on the main body and attaching the second part to the main body by the assembling device; and subsequently delivering the main body from the movable tables onto the carriage.

7. An apparatus for mounting parts to both sides of main bodies comprising a carriage for placing the main body thereon; first drive means for moving the carriage along a specified path of transport; a pair of movable tables disposed on opposite sides of the transport path and movable in parallel therewith; second and third drive means for driving the two movable tables; part supplying means for transporting a plurality of parts in a direction parallel to the transport path; a controller coupled to each of the first, the second, and the third drive means, for causing the carriage and the two movable tables to run in synchronism; a body receiving device mounted on each movable table for transferring the main body from the carriage onto the movable table and causing the movable table to support the transferred main body thereon during the synchronized running; at least one robot mounted on each movable table for receiving the part from the part supplying means and setting the part in a specified position on the main body in accordance with an operation instruction from the controller; and at least one assembling device mounted on each movable table for attaching the part set on the main body to the main body in response to an operation instruction from the controller.

8. An apparatus as defined in claim 7 wherein the part supplying means comprises a trolley assembly having a part supporter and guidable by a trolley guide rail in parallel with the body transport path, a trolley drive means for moving the trolley assembly along the guide rail through a mechanism for releasably engaging the trolley assembly, and a stopping-correcting device disposed at least at one specified location on the path of transport of parts, the stopping-correcting device comprising a movable beam reciprocatingly movable by reciprocation drive means and parallel to the guide rail, stopper means mounted on the movable beam to act on the engaging mechanism to release the trolley assembly, and clamp means mounted on the movable beam for gripping a portion of the trolley assembly.

9. An apparatus as defined in claim 8 which further comprises a part type sensor for detecting the type of the part transported by the part supplying means and feeding the detected value to the controller, the controller being operable to control the amount of movement of the movable beam by the reciprocation drive means in accordance with the detected value.

10. An apparatus as defined in claim 7 which further comprises a body type sensor disposed at a specified location on each side of the body transport path for detecting the type of the main body and feeding the detected value to the controller.

11. An apparatus as defined in claim 7 wherein the robot has a mount frame, and hook arms provided on a plurality of lower end portions of the mount frame are pivotally movable by moving means and have a receiving face engageable with the lower end of the corresponding part, the mount frame being provided with a plurality of suction members for holding the outer surface of the part as attracted thereto.

12. An apparatus as defined in claim 11 wherein each of the suction members is a vacuum cup.

13. An apparatus as defined in claim 7 wherein the body receiving device on each movable table comprises a lift beam vertically movable by lift means, a pair of seat assemblies mounted on opposite ends of the lift beam, and a pair of centering assemblies mounted on the lift beam and positioned adjacent to the seat assemblies.

14. An apparatus as defined in claim 13 wherein each of the seat assemblies comprises a base plate fixed to the lift beam, a first slide plate slidable on the base plate in a direction perpendicular to the body transport path and biased by a spring toward a specified position relative to the base plate, a second slide plate slidable on the first slide plate in a direction parallel to the body transport path and biased by a spring toward a specified position relative to the first slide plate, and a receiving plate rotatable on the second slide plate about a vertical axis.

15. An apparatus as defined in claim 13 wherein each of the centering assemblies comprises a movable member movable by drive means in a direction perpendicular to the body transport path, and a pusher mounted on the movable member and engageable with a side portion of the main body.

* * * * *

UNITED STATES PATENT AND TRADEMARK OFFICE
CERTIFICATE OF CORRECTION

PATENT NO. : 4,589,184
DATED : May 20, 1986
INVENTOR(S) : Kajio Asano, et al

It is certified that error appears in the above—identified patent and that said Letters Patent is hereby corrected as shown below:

Page 1 left hand column cancel the Assignee information in the heading on lines 9 and 10 and substitute:

Assignees: Honda Giken Kogyo Kabushiki Kaisha, Tokyo; Daifuku Co., Ltd., Osaka, both of Japan Signed and Sealed this Third Day of October, 1989

Attest:

DONALD J. QUIGG

Attesting Officer

Commissioner of Patents and Trademarks